United States Patent
Takabayashi

(10) Patent No.: US 7,244,472 B2
(45) Date of Patent: *Jul. 17, 2007

(54) ACTINIC RADIATION CURABLE COMPOSITION AND ACTINIC RADIATION CURABLE INK, AND IMAGE FORMING METHOD AS WELL AS INK JET RECORDING APPARATUS USING THE SAME

(75) Inventor: Toshiyuki Takabayashi, Hachioji (JP)

(73) Assignee: Konica Corporation, Tokyo (JP)

( * ) Notice: Subject to any disclaimer, the term of this patent is extended or adjusted under 35 U.S.C. 154(b) by 218 days.

This patent is subject to a terminal disclaimer.

(21) Appl. No.: 10/648,579

(22) Filed: Aug. 25, 2003

(65) Prior Publication Data

US 2004/0052968 A1 Mar. 18, 2004

(30) Foreign Application Priority Data

Sep. 2, 2002 (JP) ............................... 2002-256481

(51) Int. Cl.
*B05D 1/32* (2006.01)
*C08G 65/18* (2006.01)
*C08J 3/28* (2006.01)

(52) U.S. Cl. ...................... 427/466; 522/31; 522/168

(58) Field of Classification Search .............. 522/31, 522/25, 168; 427/466
See application file for complete search history.

(56) References Cited

U.S. PATENT DOCUMENTS

| 5,641,346 | A | * | 6/1997 | Mantell et al. ........... 106/31.58 |
| 5,674,922 | A | * | 10/1997 | Igarashi et al. ............. 522/168 |
| 5,882,842 | A | * | 3/1999 | Akaki et al. .............. 430/280.1 |
| 6,110,987 | A | | 8/2000 | Kamata et al. |
| 6,166,100 | A | * | 12/2000 | Hiwara et al. .............. 522/110 |
| 6,313,188 | B1 | * | 11/2001 | Takahashi ..................... 522/25 |
| 6,368,769 | B1 | * | 4/2002 | Ohkawa et al. .......... 430/270.1 |
| 6,451,873 | B1 | * | 9/2002 | Stone et al. ................. 523/160 |
| 6,846,074 | B2 | * | 1/2005 | Hirai .......................... 347/102 |
| 6,959,986 | B2 | * | 11/2005 | Ushirogouchi et al. ..... 347/100 |
| 2003/0222960 | A1 | * | 12/2003 | Takabayashi ............... 347/102 |
| 2004/0252171 | A1 | * | 12/2004 | Nishizeki et al. ........... 347/100 |

FOREIGN PATENT DOCUMENTS

| EP | 0 136 679 A2 | 4/1985 |
| EP | 1 036 789 A1 | 9/2000 |
| JP | 7-53711 A | 2/1995 |
| JP | 9-278813 A | 10/1997 |
| JP | 10-152554 A | 6/1998 |
| JP | 10-212307 A | 8/1998 |
| JP | 10-279616 A | 10/1998 |

* cited by examiner

*Primary Examiner*—Susan Berman
(74) *Attorney, Agent, or Firm*—Frishauf, Holtz, Goodman & Chick, P.C.

(57) ABSTRACT

An actinic radiation curable composition, comprising a photo-acid generating agent selected from the group consisting of sulfonium represented by General Formulas (I)–(III).

11 Claims, 1 Drawing Sheet

ACTINIC RADIATION CURABLE COMPOSITION AND ACTINIC RADIATION CURABLE INK, AND IMAGE FORMING METHOD AS WELL AS INK JET RECORDING APPARATUS USING THE SAME

TECHNICAL FIELD

The present invention relates to an actinic radiation curable composition and an actinic radiation curable ink which are capable of forming highly detailed images on various kinds of recording materials under various printing ambiences, and to an image forming method as well as an ink-jet recording apparatus using the same.

BACKGROUND

In recent years, ink-jet recording systems have been applied to various printing fields such as photography, various printing, marking, and special printing such as color filters due to its capability of forming images simply and easily. It has become possible to achieve image quality comparable to silver salt photography, specifically by employing recording apparatuses which eject minute dots under control, inks which exhibit an enhanced color reproduction range as well as enhanced durability, and improved ejection adaptability, and special sheets which exhibit markedly improved ink absorbability, color forming properties of colorants and acceptable surface gloss. Enhancement of image quality of the current ink-jet recording system is achievable only by simultaneously improvement of all the recording apparatuses, inks and special sheets.

However, ink-jet systems, which require special sheets, results in problems such as limitations of recording media as well as an higher cost of the aforesaid recording media. As a result, a number of trials have been made in which recording is carried out on image receiving media different from such special sheets, while employing various ink-jet systems. Specific examples include a phase change ink-jet system using a wax ink which is solid at room temperature, a solvent based ink-jet system using an ink comprised of rapid drying organic solvents as a main component, and a UV ink-jet system in which after image recording, crosslinking is carried out employing ultraviolet radiation (UV radiation).

Of these, in recent years, the UV ink-jet system has received attention due to relatively low generation of unpleasant odors, rapid drying properties, and recording capability onto recording media exhibiting no ink absorbability. Ultraviolet radiation curing ink-jet inks are disclosed, for example, in Japanese Patent Publication No. 5054667, Japanese Patent Publication Open to Public Inspection No. 6-200204, and Japanese Patent Publication Open to Public Inspection (under PCT Application) No. 2000-504778.

However, even though these inks are employed, it is very difficult to form highly detailed images on all the recording materials due to large changes of ink dot diameter after the impingement, depending on the types of recording materials and operation environments.

On the other hand, it is known (e.g., Japanese Patent Application Open to Public Inspection No. 2000-186071, pages 4–7) that sulfonium salts are incorporated in the aforesaid ultraviolet radiation curing ink-jet ink as an initiator. However, the ultraviolet radiation curable ink, employing such sulfonium salt initiators results in the problems described below.

Namely, the aforesaid ultraviolet radiation curable ink is divided mainly into a radical polymerization type ultraviolet radiation curable ink mainly comprised of an acryl based composition, and a cation polymerization type ultraviolet radiation curable ink. The radical polymerization type ultraviolet radiation curable ink exhibits problems in which from the standpoint of the polymerization mechanism, its curability is degraded due to the presence of oxygen which hinders curing. On the other hand, the cation polymerization type ultraviolet curable ink does no exhibit degradation of curability due to the presence of oxygen. However, problems occur in which curing tends to be adversely affected by water (humidity) at a molecular level from the standpoint of its polymerization reaction.

SUMMARY

From the viewpoint of the aforesaid problems, the present invention was achieved. An objective of the present invention is to provide an actinic radiation curable composition and an actinic radiation curable ink which are capable of very consistently recording a highly detailed image which exhibits excellent text quality and results in no generation of color mixing under various printing ambiences, and an image forming method as well as an ink-jet recording apparatus using the same.

An actinic radiation curable composition is also called as photo-curable composition, and an actinic radiation curable ink is also called as photo-curable ink.

The aforesaid objective of the present invention was achieved employing the embodiments described below.

1. An actinic radiation curable composition wherein a photo-acid generating agent is at least one of the sulfonium salts selected from General Formulas (I) to (III):

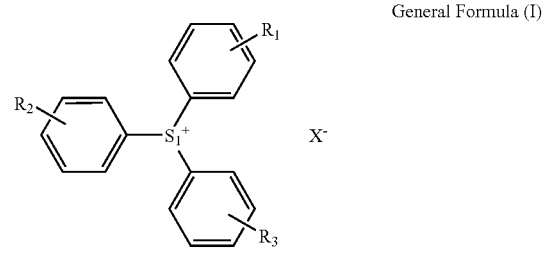

General Formula (I)

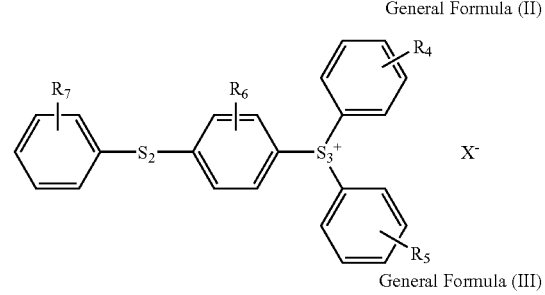

General Formula (II)

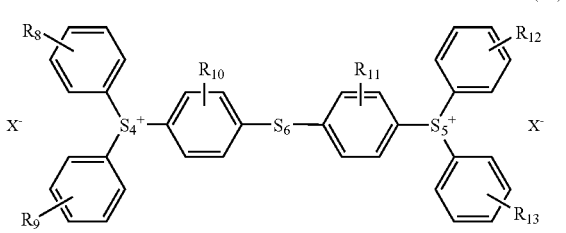

General Formula (III)

2. The actinic radiation curable composition of item 1, comprising, as a photopolymerizable monomer, at least one compound having an oxetane ring.

3. The actinic radiation curable composition of item 1 or 2, comprising, as a photopolymerizable monomer, at least one compound having an oxirane group.
4. The actinic radiation curable composition any one of items 1 to 3, comprising, as a photopolymerizable monomer, a compound having at least one oxetane ring in an amount of 60 to 95 weight percent, a compound having at least one oxirane group in an amount of 5 to 40 weight percent, and at least one vinyl ether compound in an amount of 0 to 40 weight percent. The weight percent is based on the total weight of the composition.
5. The actinic radiation curable composition of any one of items 1 to 4, wherein as a photopolymerizable monomer, a monofunctional oxetane compound having one oxetane ring is employed together with a multifunctional oxetane compound having at least two oxetane rings.
6. The actinic radiation curable composition of any one of items 1 to 5, exhibiting a viscosity of 7 to 50 mPa·s at 25° C.
7. The actinic radiation curable composition of any one of items 1 to 6, comprising a pigment.
8. An image forming method using the actinic radiation curable ink of item 7, comprising the steps of:
    (a) jetting a droplet of the ink from a nozzle of an ink-jet recording head to form an image onto a recording material; and
    (b) irradiating the image with an actinic ray,
    wherein the irradiation step is carried out between 0.001 and 2.0 seconds after jetting of the droplet of the ink.
9. An image forming method using the actinic radiation curable ink of item 7, comprising the steps of:
    (a) jetting a droplet of the ink from a nozzle of an ink-jet recording head to form an image onto a recording material; and
    (b) irradiating the image with an actinic ray,
    wherein after the irradiation step, a thickness of the ink on the recording material is 2 to 20 µm.
10. An image forming method using the actinic radiation curable ink of item 7, comprising the steps of:
    (a) jetting a droplet of the ink from a nozzle of an ink-jet recording head to form an image onto a recording material; and
    (b) irradiating the image with an actinic ray,
    wherein a volume of the droplet of the ink jetted from the nozzle is 2 to 15 pl.
11. An ink-jet recording apparatus for the image forming method of any one of items 8 to 10, wherein the actinic radiation curable ink and the recording head is heated to 35 to 100° C. before the jetting step is carried out.

The inventors of the present invention discovered that when an actinic radiation curable composition comprised at least one of the sulfonium salts represented by General Formulas (I)–(III) as a photolytically acid generating agent, its curability was dramatically improved, whereby excellent curability was achieved independent of ambience (temperature and humidity) during curing. Thus the present invention was achieved.

Specifically, when pigments are incorporated into the actinic radiation curable composition which is constituted according to the present invention and subsequently the resulting mixture is employed as an actinic radiation curable ink (hereinafter also referred simply to as an ink) which is employed as an ink-jet ink, excellent ejection stability, which is regarded as a critical characteristic during ink-jet recording, is achieved and the dot diameter after ink impingement on recording materials can easily be controlled, being independent of the ambience during curing, whereby it is possible to form high quality images for desired reproduction. Thus the aforesaid constitution is truly remarkable.

DESCRIPTION OF THE PREFERRED EMBODIMENTS

Figure 1:
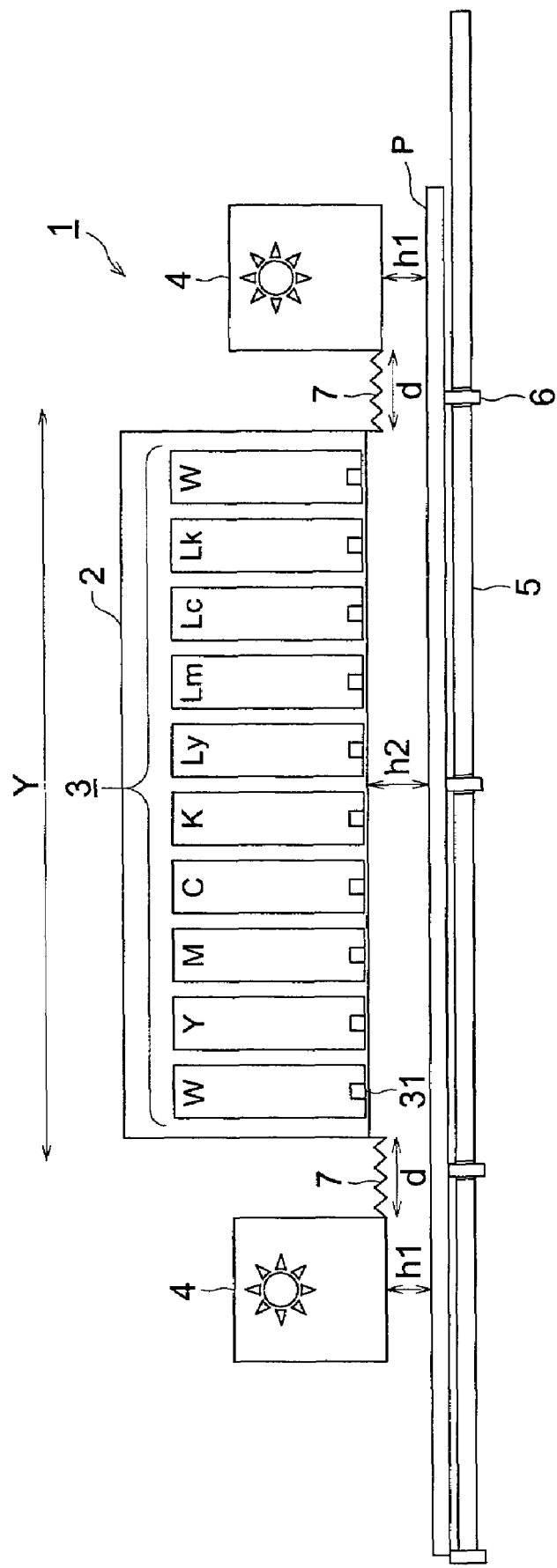
FIG. 1 is a front view showing the structure of the main section of the recording apparatus of the present invention.

The present invention will now be detailed.

Initially, sulfonium salts represented by General Formulas (I)–(III) will be described.

In General Formulas (I)–(III), $R_1$–$R_{13}$ each represents a hydrogen atom or a substituent, wherein $R_1$–$R_3$ do not represent a hydrogen atom at the same time, $R_4$–$R_7$ do not represent a hydrogen atom at the same time, and $R_8$–$R_{13}$ do not represent a hydrogen atom at the same time.

Preferably listed as substituents represented by $R_1$–$R_{13}$ may be an alkyl group such as a methyl group, an ethyl group, a propyl group, an isopropyl group, a butyl group, an isobutyl group, a t-butyl group, a pentyl group, or a hexyl group, an alkoxy group such as a methoxy group, an ethoxy group, a propoxy group, a butoxy group, a hexyloxy group, a decyloxy group, or a dodecyloxy group, a carbonyl group such as an acetoxy group, a propionyloxy group, a decylcarbonyloxy group, a dodecylcarbonyloxy group, a methoxycarbonyl group, an ethoxycarbonyl group, or a benzoyloxy group, a phenylthio group, a halogen atom such as fluorine, chlorine, bromine, or iodine, a cyano group, a nitro group, and a hydroxy group.

X represents a non-nucleophilic anion group which includes, for example, halogen atoms such as F, Cl, Br, or I, B $(C_6F_5)_4$, $R_{14}COO$, $R_{15}SO_3$, $SbF_6$, $AsF_6$, $PF_6$, or $BF_4$, wherein $R_{14}$ and $R_{15}$ each represents an alkyl group such as a methyl group, an ethyl group, a propyl group, or a butyl group, a halogen atom such as fluorine, chlorine, bromine, or iodine, a nitro group, a cyano group, an alkyl group or a phenyl group which may be substituted with a methoxy group or an ethoxy group. Of these, from the viewpoint of safety, preferred are $B(C_6F_5)$ and $PF_4$.

$S_1$ to $S_6$ each represents a sulfur atom.

The present invention is characterized in that the maximum value of the bond distance between $S_1$ and the adjacent C atom in General Formula (I), the maximum value of the bond distance between $S_3$ and the adjacent C atom in General Formula (II), and the maximum value of the bond distance between $S_4$ and the adjacent C atom and the maximum value of the bond distance between $S_5$ and the adjacent C atom in General Formula (III), are 0.1686–0.1750 nm, respectively. "Bond distance", as described herein, refers to the value calculated based on the molecular orbital calculation method, employing WinMOPAC (manufactured by Fujitsu Ltd.).

When the aforesaid bond distance is at most 0.1686 nm, sufficient curing is not achieved. On the other hand, when it exceeds 0.1750 nm, the resulting compound bond tends to be easily broken, resulting in problems of storage stability.

Specific examples of the sulfonium compounds represented by General Formulas (I)–(III) are illustrated below. However, the present invention is not limited thereto.

Exemplified Compound (General Formula (I))

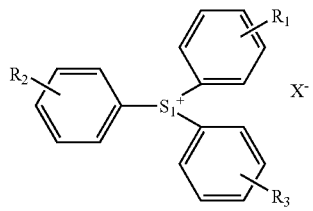

| Exemplified Compound No. | R₁ | R₂ | R₃ | S—C Bond Distance *1 (nm) | X⁻ |
|---|---|---|---|---|---|
| 1 | —OCH₃ | —OCH₃ | —CF₃ | 0.1695 | B(C₆F₅)₄⁻, SbF₆⁻, PF₆⁻ |
| 2 | —OCH₃ | —OCH₃ | —COF₃ | 0.1696 | B(C₆F₅)₄⁻, SbF₆⁻, PF₆⁻ |
| 3 | *2 | *2 | —COF₃ | 0.1696 | B(C₆F₅)₄⁻, SbF₆⁻, PF₆⁻ |
| 4 | —OCH₃ | —CF₃ | —CF₃ | 0.1692 | B(C₆F₅)₄⁻, SbF₆⁻, PF₆⁻ |
| 5 | —CF₃ | —CF₃ | —CF₃ | 0.1688 | B(C₆F₅)₄⁻, SbF₆⁻, PF₆⁻ |
| 6 | -tBu | -tBu | —CF₃ | 0.1695 | B(C₆F₅)₄⁻, SbF₆⁻, PF₆⁻ |
| 7 | -iPro | -iPro | —CF₃ | 0.1695 | B(C₆F₅)₄⁻, SbF₆⁻, PF₆⁻ |

*1 Maximum value (nm) of the bond distance between $S_1$ and the adjacent C atom

*2 $\overset{\diagdown}{HC}=CH_2$

In Exemplified Compounds 1–7, all the substituents are substituted at the p position.

Exemplified Compound (General Formula (II))

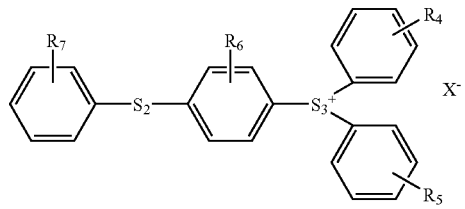

| Exemplified Compound No. | R₄ | R₅ | R₆ | R₇ | S—C Bond Distance *3 (nm) | X⁻ |
|---|---|---|---|---|---|---|
| 8 | —CF₃ | —CF₃ | H | H | 0.1693 | B(C₆F₅)₄⁻, SbF₆⁻, PF₆⁻ |
| 9 | —CF₃ | —CF₃ | H | —CF₃ | 0.1692 | B(C₆F₅)₄⁻, SbF₆⁻, PF₆⁻ |
| 10 | —CF₃ | —OCH₃ | H | H | 0.1696 | B(C₆F₅)₄⁻, SbF₆⁻, PF₆⁻ |
| 11 | —CF₃ | —CH₃ | H | H | 0.1696 | B(C₆F₅)₄⁻, SbF₆⁻, PF₆⁻ |
| 12 | —CF₃ | -iPro | H | H | 0.1697 | B(C₆F₅)₄⁻, SbF₆⁻, PF₆⁻ |
| 13 | —CF₃ | -iPro | —OCH₃ | -iPro | 0.1695 | B(C₆F₅)₄⁻, SbF₆⁻, PF₆⁻ |
| 14 | —CF₂H | —CF₂H | —OCH₃ | -iPro | 0.1690 | B(C₆F₅)₄⁻, SbF₆⁻, PF₆⁻ |
| 15 | —CF₂H | —CF₂H | —CH₃ | -iPro | 0.1691 | B(C₆F₅)₄⁻, SbF₆⁻, PF₆⁻ |
| 16 | —CF₃ | -iPro | —CH₂CH₃ | -iPro | 0.1696 | B(C₆F₅)₄⁻, SbF₆⁻, PF₆⁻ |
| 17 | —CF₃ | —CH₂CH₃ | —CF₃ | -iPro | 0.1693 | B(C₆F₅)₄⁻, SbF₆⁻, PF₆⁻ |

*3: Maximum value (nm) of the bond distance between $S_3$ and the adjacent C atom In Exemplified Compounds 8–17, all the substituents of $R_4$, $R_5$, and $R_7$ are substituted at the p position, and the substituent of $R_6$ is substituted at position 2.

Exemplified Compound (General Formula (III))

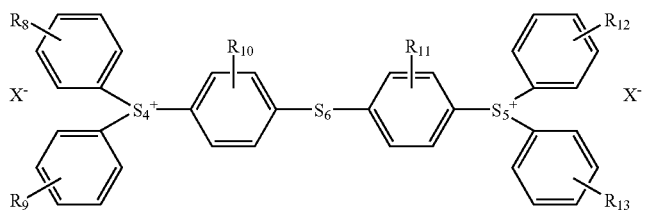

| Exemplified Compound No. | $R_8$ | $R_9$ | $R_{10}$ | $R_{11}$ | $R_{12}$ | $R_{13}$ | S—C Bond Distance *4 (nm) | $X^-$ |
|---|---|---|---|---|---|---|---|---|
| 18 | —$CF_2H$ | —$CF_2H$ | —$OCH_3$ | H | —$CF_2H$ | —$CF_2H$ | 0.1694 | $B(C_6F_5)_4^-$, $SbF_6^-$, $PF_6^-$ |
| 19 | —$CF_3$ | —$CH_2CH_3$ | —$CH_2CH_3$ | H | —$CF_3$ | —$CH_2CH_3$ | 0.1695 | $B(C_6F_5)_4^-$, $SbF_6^-$, $PF_6^-$ |
| 20 | —$CF_3$ | -iPro | —$CH_2CH_3$ | H | —$CF_3$ | -iPro | 0.1695 | $B(C_6F_5)_4^-$, $SbF_6^-$, $PF_6^-$ |
| 21 | —$CF_2H$ | —$CH_2CH_3$ | —$OCH_3$ | H | —$CF_2H$ | —$CH_2CH_3$ | 0.1693 | $B(C_6F_5)_4^-$, $SbF_6^-$, $PF_6^-$ |
| 22 | —$CF_2H$ | -iPro | —$CH_2CH_3$ | H | —$CF_2H$ | -iPro | 0.1690 | $B(C_6F_5)_4^-$, $SbF_6^-$, $PF_6^-$ |

*4: Maximum value (nm) of the bond distance between $S_4$ and the adjacent C atom and between $S_5$ and the adjacent C atom.

It is possible to easily synthesize the aforesaid compounds employing the methods known in the art such as the method described in Journal of Polymer Science; Part A Polymer Chemistry, Vol. 37, 4242–4252.

In the present invention, it is possible to use the sulfonium salts described above, which are represented by General Formulas (I)–(III), together with conventional photolytically acid generating agents known in the art.

Examples of photolytically acid generating agents which may be employed together with the aforesaid sulfonium compounds include compounds which are employed in chemical amplification type photoresists and cation photopolymerization (refer to "Imaging you Yuki Zairyo (Organic Materials for Imaging)", edited by Yuki Electronics Zairyo Kenkyu Kai, Bunshin Shuppan (1993), pages 187–192). Examples of compounds suitable for the present invention are listed below.

Initially, it is possible to list B $(C_6F_5)_4^-$, $PF_6^-$, $AsF_6^-$, $SbF_6^-$, and $CF_3SO_3^-$ salts of aromatic onium compounds such as diazonium, ammonium, iodonium, sulfonium and phosphonium.

Specific examples of onium compounds, which can be employed in the presnt invention, are listed below.

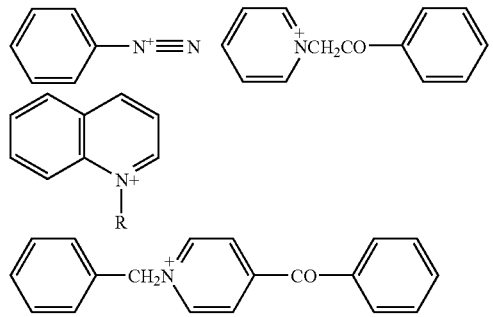

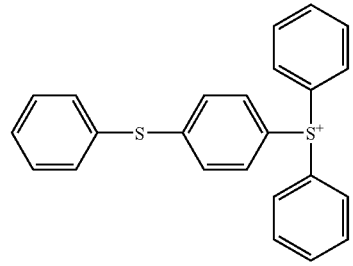

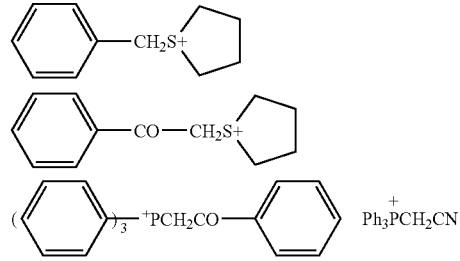

Secondary, it is possible to list sulfonate compounds which generate sulfonic acid. Specific compounds are illustrated below.

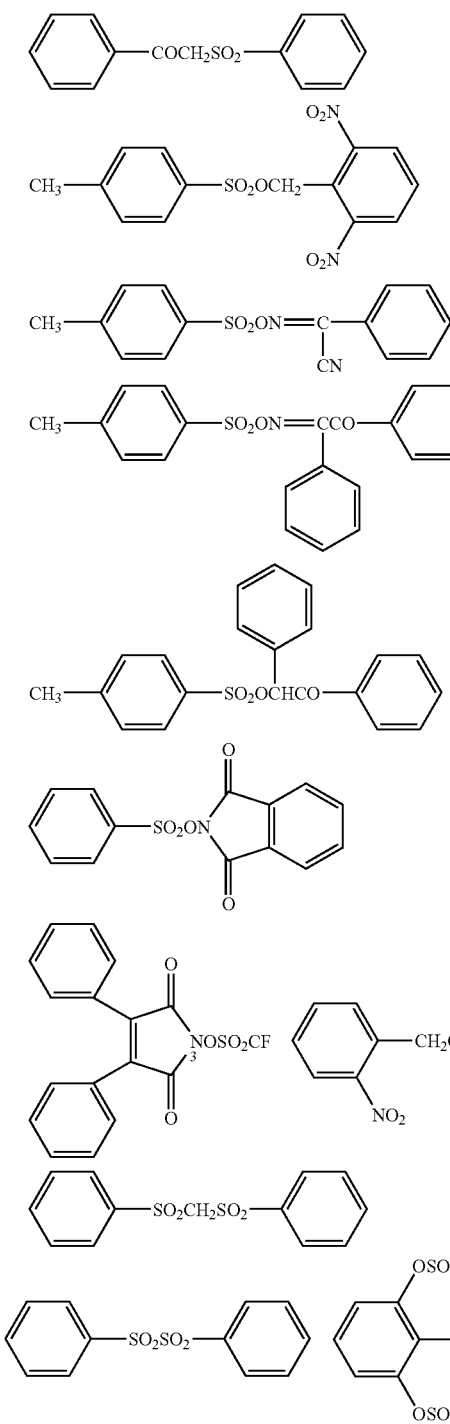

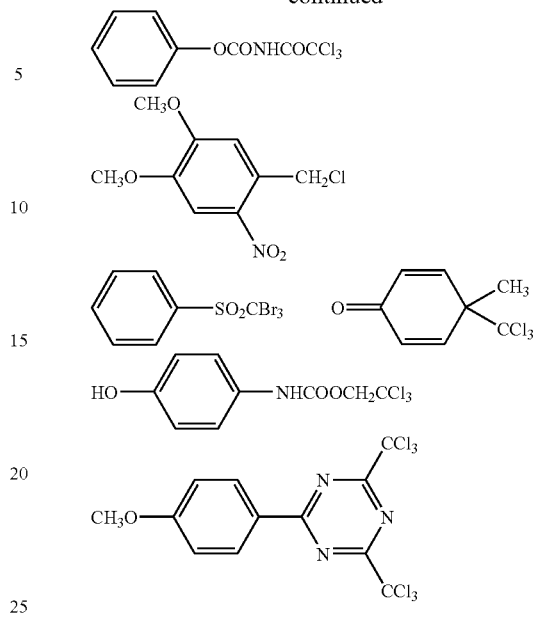

Fourthly, it is possible to employ iron arene complexes as exemplified below.

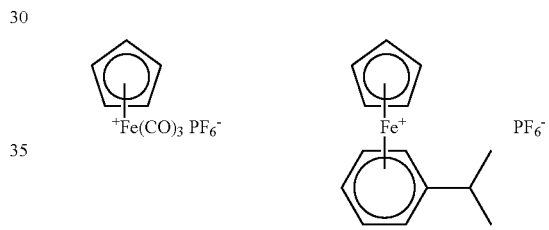

The ink of the present invention preferably comprises acid increasing agents which newly generate acid utilizing acid generated by exposure of actinic radiation, being known in the art through patent publications such as Japanese Patent Application Open to Public Inspection Nos. 8-248561 and 9-34106. In addition, it is possible to enhance ejection stability by employing the aforesaid acid multiplying agents.

In the ink of the present invention, it is preferable that as photopolymerizable monomers, at least one compound, having an oxetane ring, is incorporated.

The oxetane compounds usable in the present invention refer to compounds having an oxetane ring. It is possible to employ any oxetane compounds, known in the art, such as those introduced in Japanese Patent Application Open to Public Inspection Nos. 2001-220526 and 2001-310937.

Further, in order to enhance layer strength as well as close-adhesion to recording materials after curing, it is preferable to use monofunctional oxetane compounds having one oxetane ring together with multifunctional oxetane compounds having at least two oxetane rings. However, when compounds having at least 5 oxetane rings are used, it becomes difficult to work with the resulting ink composition due to an increase in viscosity, and the adhesion property of the resulting cured materials is degraded due to an increase in glass transition temperature of the resulting ink composition. The compounds employed in the present invention preferably have 1–4 oxetane rings.

Thirdly, it is possible to employ halides which photolytically generate hydrogen halide. The specific compounds are exemplified below.

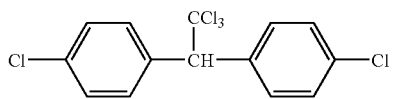

Specific examples of compounds having oxetane ring(s) according to the present invention will now be described. However, the present invention is not limited thereto.

Listed as examples of compounds having one oxetane ring are those represented by General Formula (1) described below.

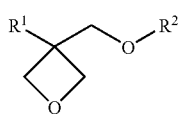

General Formula (1)

In General Formula (1), $R^1$ represents a hydrogen atom, an alkyl group having 1–6 carbon atoms such as a methyl group, an ethyl group, a propyl group, or a butyl group, a fluoroalkyl group having 1–6 carbon atoms, an allyl group, an aryl group, a furyl group, or a thienyl group, while $R^2$ represents an alkyl group having 1–6 carbon atoms such as a methyl group, an ethyl group, a propyl group, or a butyl group, an alkenyl group having 2–6 carbon atoms such as a 1-propenyl group, a 2-propenyl group, a 2-methyl-1-propenyl group, a 2-methyl-2-propenyl group, a 1-butenyl group a 2-butenyl group, or a 3-butenyl group, a group having an aromatic ring such as a phenyl group, a benzyl group, a fluorobenzyl group, a methoxybenzyl group, or a phenoxyethyl group, an alkylcarbonyl group having 2–6 carbon atoms such as an ethylcarbonyl group, a propylcarbonyl group, or a butylcarbonyl group, an alkoxycarbonyl group having 2–6 carbon atoms such as an ethoxycarbonyl group, a propoxycarbonyl group, or a butoxycarbonyl group, or an N-alkylcarbamoyl group having 2–6 carbon atoms such as an ethylcarbamoyl group, a propylcarbamoyl group, a butylcarbamoyl group, or a pentylcarbamoyl group. Most preferably employed as oxetane compounds used in the present invention are compounds having one oxetane ring, because the resulting composition exhibits excellent adhesion property and also excellent workability due to its lower viscosity.

Listed as examples of compounds having two oxetane rings are those represented by General Formula (2) described below.

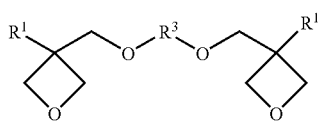

General Formula (2)

In General Formula (2), $R^1$ represents the same groups as those in aforesaid General Formula (1), while $R^2$ represents, for example, a straight or branched alkylene group such as an ethylene group, a propylene group, or a butylenes group, a straight or branched poly(alkyleneoxy) group such as a poly(ethyleneoxy) group or a poly(propyleneoxy) group, a straight or branched unsaturated hydrocarbon group such as a propenylene group, a methylpropenylene group, or a butenylene group, an alkylene group comprising a carbonyl group, an alkylene group comprising a carbonyl group, an alkylene group comprising a carbonyl group; an alkylene group comprising a carboxyl group, or an alkylene group comprising a carbamoyl group.

Further, $R^3$ represents a multivalent group selected from groups represented by General Formulas (3), (4), and (5) described below.

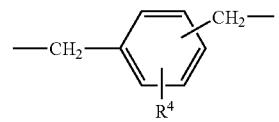

General Formula (3)

In General Formula (3), $R^4$ represents a hydrogen atom or an alkyl group having 1–4 carbon atoms such as a methyl group, an ethyl group, a propyl group, or a butyl group, an alkoxy group having 1–4 carbon atoms such as a methoxy group, an ethoxy group, a propoxy group, or a butoxy group, a halogen atom such as a chlorine atom or a bromine atom, a nitro group, a cyano group, a mercapto group, a lower alkylcarboxyl group, or a carbamoyl group.

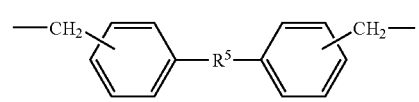

General Formula (4)

In General Formula (4), $R^5$ represents an oxygen atom, a sulfur atom, a methylene group, NH, SO, $SO_2$, $C(CF_3)_2$, or $C(CH_3)_2$.

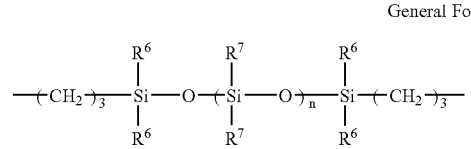

General Formula (5)

In General Formula (5), $R^6$ represents an alkyl group having 1–4 carbon atoms such as a methyl group, an ethyl group, a propyl group, or a butyl group, or an aryl group; n represents an integer of 0–2,000; $R^7$ represents an alkyl group having 1–4 carbon atoms such as a methyl group, an ethyl group, a propyl group, or a butyl group, or an aryl group; and $R^7$ also represents a group selected from the groups represented by General Formula (6) described below.

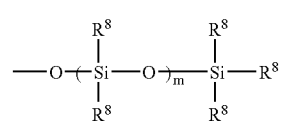

General Formula (6)

In General Formula (6), $R^8$ represents an alkyl group having 1–4 carbon atoms such as a methyl group, an ethyl group, a propyl group, or a butyl group, or an aryl group, and m represents an integer of 0–100.

Listed as specific examples of compounds having two oxetane rings are the compounds described below.

Exemplified Compound 1

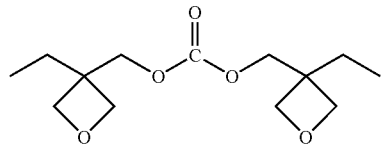

Exemplified Compound 2

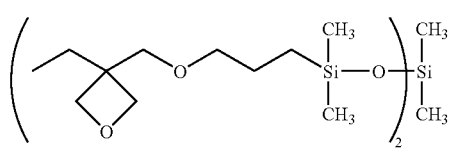

Exemplified Compound 1 is the compound in which in aforesaid General Formula (2), $R^1$ is an ethyl group, while $R^3$ is a carboxyl group. Further, Exemplified Compound 2 is the compound in which in aforesaid General Formula (2), $R^1$ is an ethyl group, in aforesaid General Formula (5), $R^3$ is $R^1$, $R^7$ is a methyl group, and n is 1.

Of compounds having two oxetane rings, examples of preferred compounds, other than those described above, include compounds represented by General Formula (7) described below. In General Formula (7), $R^1$ is as defined in aforesaid General Formula (1) for $R^1$.

General Formula (7)

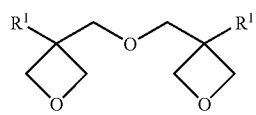

Further, listed as examples of compounds having 3–4 oxentane rings are the compounds represented by General Formula (8) described below.

General Formula (8)

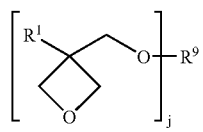

In General Formula (8), $R^1$ is as defined in aforesaid General Formula (1) for $R^1$, $R^9$ presents, for example, a branched alkylene group having 1–12 carbon atoms such as the groups represented by A–C described below, a branched poly(alkyleneoxy) group such as the groups represented by D described below, or a branched polysiloxy group such as the groups represented by E described below, and j represents 3 or 4.

A

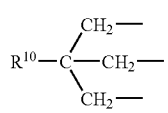

B

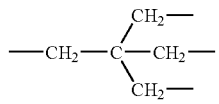

C

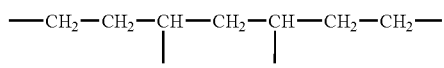

D

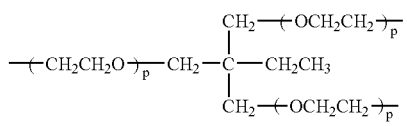

E

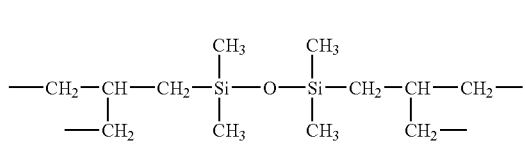

In aforesaid A, $R^{10}$ represents a lower alkyl group such as a methyl group, an ethyl group, or a propyl group. Further, in aforesaid D, p represents an integer of 1–10.

Listed as one example of a compound having 3–4 oxetane rings is Exemplified Compound 3.

Exemplified Compound 3

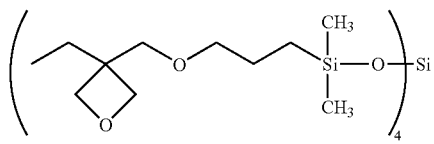

Further, listed as examples of compounds having 1–4 oxetane rings are compounds represented by General Formula (9) described below.

General formula (9)

$$R^{11}-O-\left[\begin{array}{c}R^8\\|\\Si-O\\|\\(CH_2)_3\\|\\O\\ \end{array}\right]_r -R^{11}$$

(with oxetane ring bearing $R^1$ attached)

In General Formula (9), $R^8$ is as defined in aforesaid General Formula (6) for $R^8$, $R_{11}$ represents an alkyl group having 1–4 carbon atoms such as a methyl group, an ethyl group, a propyl group, or a butyl group, or a trialkylsilyl group, and r represents 1–4.

Specific examples of oxetane compounds preferably employed in the present invention include the compounds described below.

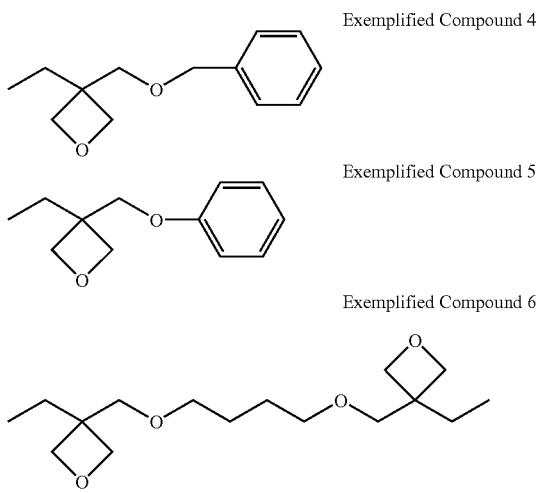

Exemplified Compound 4

Exemplified Compound 5

Exemplified Compound 6

Production methods of each compound having oxetane ring(s) described above are not particularly limited and any conventionally known methods may be employed. For example, an oxetane ring synthesis method, which employs diols as a raw material, is known which is disclosed in J. Am. Chen. Soc., 3455, 79 (1957)). Further, other than these, listed are compounds, having 1–4 oxetane rings, which have a high molecular weight such as 1,000–5,000. Listed as specific examples of these compounds are the compounds described below.

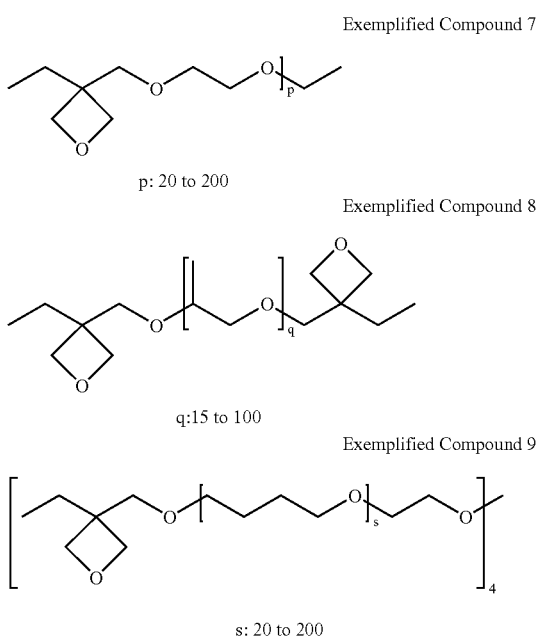

Exemplified Compound 7 p: 20 to 200

Exemplified Compound 8 q:15 to 100

Exemplified Compound 9 s: 20 to 200

Further, in the present invention, in order to enhance curability, compounds which have at least one oxirane ring are preferably incorporated.

The compounds having oxirane ring(s) according to the present invention are those having in the molecule at least one oxirane ring represented by the formula below.

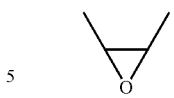

Further, those which are customarily employed as epoxy resins are usable in the form of any of a monomer, oligomer, or polymer.

Specifically listed are aromatic epoxides, alicyclic epoxides, and aliphatic epoxides which are known in the art. Further, epoxides, as described herein, refer to monomers and oligomers. These compounds may be employed individually or in combinations of at least two types.

Listed as epoxides are aromatic, alicyclic, and aromatic epoxides.

Preferred aromatic epoxides include di- or polyglycidyl ethers prepared by allowing polyhydric phenols having at least one aromatic nucleus or alkylene oxide addition products thereof to react with epichlorohydrine. For example, listed are di- or polyglycidyl ethers of bisphenol A or alkylene oxide addition products thereof, di- or polyglycidyl ethers of hydrogenated bisphenol A or alkylene oxide addition products thereof, or novolak type epoxy resins. Herein, listed as alkylene oxides are ethylene oxides and propylene oxides.

Alicyclic epoxides are preferably compounds containing cyclohexane oxide or cyclopentane oxide which are prepared by epoxidizing compounds having at least one cycloalkane ring such as a cyclohexane or cyclopentane ring, employing suitable oxidizing agents such as hydrogen peroxide or peracids.

Preferred aliphatic epoxides include di- or polyglycidyl ethers of aliphatic polyhydric alcohols or alkylene oxide addition products thereof. Representative examples include diglycidyl ethers of alkylene glycol such as diglycidyl ether of ethylene glycol, diglycidyl ether of propylene glycol, or diglycidyl ether of 6-hexnediol, and diglycidyl ethers of polyalkylene glycol such as polyglycidyl ether of polyhydric alcohols such as di- or triglycidyl ethers of glycerin or alkylene oxide addition products thereof or diglycidyl ether of polyethylene glycol or alkylene oxide addition products thereof, diglycidyl ether of polypropylene glycol or alkylene oxide addition products thereof. Herein, listed as alkylene oxides are ethylene oxide and propylene oxide.

Of these epoxides, when considering rapid curing, aromatic epoxides as well as alicyclic epoxides are preferred, and alicyclic epoxides are particularly preferred. In the present invention, the aforesaid epoxides may be employed individually or in suitable combinations of at least two types.

Further, in the present invention, employed may be any of the vinyl ether compounds known in the art.

Examples of vinyl ether compounds include di- or trivinyl ether compounds such as ethylene glycol divinyl ether, diethylene glycol divinyl ether, triethylene glycol divinyl ether, propylene glycol divinyl ether, dipropylene glycol divinyl ether, butanediol divinyl ether, hexanediol divinyl ether, cyclohexanedimethanol divinyl ether, trimethylolpropane trivinyl ether, and monovinyl ether compounds such as ethyl vinyl ether, n-butyl vinyl ether, isobutyl vinyl ether, octadecyl vinyl ether, cyclohexyl vinyl ether, hydroxybutyl vinyl ether, 2-ethylhexyl vinyl ether, cyclohexanedimethanol monovinyl ether, n-propyl vinyl ether, isopropyl vinyl ether, isopropenyl ether-O-propylene carbonate, dodecyl vinyl ether, diethylene glycol monovinyl ether, and octadecyl vinyl ether.

Of these vinyl ether compounds, when considering curability, adhesion property, and surface hardness, di- or trivinyl ether compounds are preferred and divinyl ether compounds are particularly preferred. In the present invention, the aforesaid vinyl ether compounds may be employed individually or in suitable combinations of at least two types.

The added amount of the aforesaid photopolymerizable monomers is preferably adjusted in such a manner that the compound having at least one type of the oxetane ring is in an amount of 60–95 percent by weight, the compound having at least one type of the oxirane group is in an amount of 5–40 percent by weight, and at least one type of the vinyl ether compound is in an amount of 0–40 percent by weight.

The actinic radiation polymerizable ink of the present invention is comprised of pigments together with the aforesaid actinic radiation curable composition.

Pigments which are preferably employed in the present invention are listed below.

C.I. Pigment Yellow-1,3, 12, 13, 14, 17, 81, 83, 87, 95, 109, and 42

C.I. Pigment Orange-16, 36, and 38

C.I. Pigment Red-5, 22, 38, 48:1, 48:2, 48:4, 49:1, 53:1, 57:1, 63:1, 144, 146, 185, and 101

C.I. Pigment Violet-19 and 23

C.I. Pigment Blue-15:1, 15:3, 15:4, 18, 60, 27, and 29

C.I. Pigment Green-7 and 36

C.I. Pigment White-6, 18, and 21

C.I. Pigment Black-7

Further, in the present invention, in order to enhance covering power of color on transparent substrates such as plastic film, it is preferable to use a white ink. Specifically, in soft package printing and label printing, it is preferable to use a white ink. However, since the ejection amount needs to be increased, from the viewpoint of the aforesaid ejection stability, and the formation of curling and wrinkling, the amount to be used is obviously limited.

The aforesaid pigments may be dispersed, employing for example, a ball mill, a sand mill, an attritor, a roller mill, an agitator, a Henschel mill, a colloid mill, an ultrasonic homogenizer, a pearl mill, a wet type jet mill, and a paint shaker. Further, during dispersion of pigments, it is possible to add dispersing agents. Preferably employed as dispersing agents are polymer dispersing agents. Listed as polymer dispersing agents are Solsperse Series available from Avecia Co. Further, employed as dispersing aids may be synergists corresponding to each of various types of pigments. The added amount of the aforesaid dispersing agents and dispersing aids is preferably 1–50 parts by weight with respect to 100 parts by weight of the pigments. Dispersion media are to be comprised of solvents or polymerizable compounds. In the radiation curable type ink employed in the present invention, in order to allow the aforesaid ink to undergo reaction and curing, it is preferable to avoid solvents. When solvents remain in cured images, solvent resistance is degraded and VOC problems of remaining solvents also occur. Therefore, it is preferable that in the dispersion media, polymerizable compounds are used instead of solvents. Of polymerizable compounds, from the viewpoint of appropriate dispersion, it is preferable to select monomers at the lowest viscosity.

Pigments are preferably dispersed to result in an average particle diameter of 0.08–0.5 μm. Suitable pigments, dispersing agents, dispersion media, dispersing conditions and filtering conditions are selected and set so that the maximum particle diameter is controlled to be in the range of 0.3–10 μm and preferably 0.3–3 μm. By the aforesaid particle diameter management, it is possible to minimize clogging of head nozzles, as well as to maintain storage stability of the ink, ink transparency and curing speed.

Concentration of colorants in the photocurable ink according to the present invention is preferably 1–10 percent by weight with respect to the total ink.

Other than those described above, employed in the actinic radiation curable ink of the present invention may be various additives. Listed are, for example, surface active agents, leveling additives, matting agents, polyester based resins, polyurethane based resins, vinyl based resins, acrylic based resins, rubber based resins, and waxes to adjust physical properties of the layers. Further, for the purpose of improving storage stability, it is possible to employ any of the appropriate basic compounds known in the art. Listed as representative compounds are basic alkaline metal compounds, basic alkaline earth metal compounds, and basic organic compounds such as amines. Further it is possible to prepare a radical cationic hybrid type curable ink by combining radically polymerizable monomers with initiators.

In order to achieve ejection stability as well as desired curability, irrespective of the curing ambience (temperature and humidity), the viscosity of the ink of the present invention is preferably 7–50 Pa·s at 25° C.

Other than common coated paper and non-coated paper, usable as recording materials in the present invention may be various types of non-absorptive plastics and film thereof which are employed in so-called soft packaging. Examples of various types of plastic film include PET film, OPS film, OPP film, ONy film, PVC film, PE film, and TAC film. Employed as other plastics may be polycarbonate, acryl resins, ABS, acetal, PVA, and rubber. Further, metal and glass may also be employed. Of these recording materials, when images are formed specifically on PET film, OPS film, OPP film, ONy film, or PVC film which are thermally shrinkable, the effects of the embodiments of the present invention is more pronounced. These substrates tend to result in curling and deformation of the film due to contraction during ink curing and heat generation during the curing reaction. In addition, it is difficult for the ink layer to keep pace with contraction of the aforesaid substrate.

The surface energy of these various plastic films differs from each other. As a result, heretofore, problems have occurred in which dot diameter varies after impingement, depending on the recording materials. However, in the embodiment of the present invention, it is possible to form highly detailed images on the recording materials having a wide range of surface energy of 25–60 mN/m, including OPP film as well as OPS film having a relatively low surface energy and PET film having a relatively high surface energy.

In the present invention, form the viewpoint of the cost of recording materials such as packaging cost as well as production cost, print production efficiency, and compatibility with prints of various sizes, it is more advantageous to used long (web) recording materials.

The image forming method of the present invention will now be described.

In the image forming method of the present invention, a method is preferred in which the aforesaid ink is ejected on a recording material to form images, employing an ink-jet recording system, and subsequently the resulting ink is cured while exposed to actinic radiation such as ultraviolet radiation.

(Total Ink Layer Thickness after Ink Impingement)

In the present invention, the total ink layer thickness after curing while ink is impinged on the recording material and exposed to actinic radiation is preferably 2–20 μm. In the actinic radiation curable ink-jet recording of the screen-printing field, currently the total ink layer thickness exceeds 20 μm. In the soft package printing field, in which recording materials are comprised of relatively thin plastic materials, excessive ink ejection, which results in a thick ink layer, is not preferred because problems occur in which stiffness as well as the feeling of quality of the entire printed materials varies in addition to the aforesaid problems of curling and wrinkling of recording materials.

Further, "total ink layer thickness", as described herein, refers to the maximum value of the ink layer thickness of images formed on recording materials. The aforesaid total layer thickness is applied in the same manner, even though 2-color overprinting (secondary color), 3-color overprinting, or 4-color overprinting (a white ink base) is carried out employing ink-jet recording systems.

(Ink Ejection Conditions)

Preferred ink ejection conditions are such that a recording head and ink are heated to 35–100° C. and ejection is performed to achieve ejection stability. The viscosity of an actinic radiation curable ink varies widely depending on the variation of temperature. The resulting viscosity variation results in major effects to the liquid droplet size as well as the liquid droplet ejection rate to degrade image quality. As a result, it is necessary to maintain the raised temperature at a constant value. The controlled temperature range of ink temperature is preferably set temperature ±5° C., more preferably set temperature ±2° C., and still more preferably set temperature ±1° C.

Further, in the present invention, the volume of a liquid droplet ejected from each nozzle is preferably 2–15 pl.

Originally, in order to form highly detailed images, it is necessary to maintain the volume of a liquid droplet in the aforesaid range. However, when the aforesaid volume of the liquid droplet is ejected, it becomes more difficult to achieve the aforesaid ejection stability. According to the present invention, even though ejection is carried out at a small droplet volume such as 2–15 pl, ejection stability is enhanced, whereby it is possible to consistently form highly detailed images.

(Light Exposure Conditions after Ink Impingement)

In the image forming method of the present invention, actinic radiation is preferably exposed 0.001–2.0 seconds after ink impingement and more preferably 0.001–1.0 second. In order to form highly detailed images, it is particularly critical that exposure timing is started as soon as possible.

A basic method for actinic radiation exposure is disclosed in Japanese Patent Application Open to Public Inspection No. 60-132767. According to the aforesaid patent, light sources are arranged on both sides of a head unit and aforesaid head and light sources are subjected to scanning, employing a shuttle system. Exposure is to be carried out a definite time after ink impingement. Further, curing is completed employing another light source which is not driven. U.S. Pat. No. 6,145,979 discloses exposure methods in which optical fibers are employed and UV radiation is exposed to a recording section while collimated UV radiation is incident to a mirror surface provided on the head unit side surface. In the image forming method of the present invention, any of these exposure methods may be employed.

Further, a preferred embodiment includes a method in which 2-step actinic radiation exposure is carried out in such a manner that first actinic radiation is exposed 0.001–2.0 seconds after ink impingement and after completing printing, actinic radiation is further exposed. By achieving the aforesaid 2-step actinic radiation exposure, it becomes possible to minimize contraction of recording materials which occurs during ink curing.

Heretofore, in the UV ink-jet system, in order to minimize dot spread and bleeding after ink impingement, commonly employed are high illumination intensity light sources which consume at least 1 kW·hr. However, currently, it is practically impossible to use such light sources due to excessively large contraction of recording materials, especially in shrink label printing.

In the present invention, it is preferable to use actinic radiation exhibiting the maximum illumination intensity in the wavelength range of 280–320 nm. Even when light sources at a total consumption of at least 1 kW·hr are employed, it is possible to form highly detailed images and to control the contraction of recording materials within practical allowable levels.

In the present invention, the total consumption power of light sources, which emit actinic radiation, is preferably less than 1 kW·hr. Examples of light sources at a total consumption of less than 1 kW·hr include, but are not limited to, fluorescent tubes, cold cathode tubes and LEDs.

The ink-jet recording apparatus (hereinafter referred simply to as the recording apparatus) will now be described.

The recording apparatus of the present invention will be described with reference to the drawing when deemed to be necessary. The recording apparatus in the drawing is one embodiment of the recording apparatus of the present invention, but the recording apparatus of the present invention is not limited thereto.

FIG. 1 is a front view showing the structure of the main section of the recording apparatus of the present invention. Recording apparatus 1 is comprised of head carriage 2, recording head 3, exposure means 4, and platen section 5. In recording apparatus 1, platen section 5 is arranged under recording material P. Platen section 5 exhibits an ultraviolet radiation absorbing function and absorbs excessive ultraviolet radiation which passes through recording material P, whereby it is possible to consistently reproduce highly detailed images.

Recording material P is guided by guide member 6 and moves from the front to the back of FIG. 1 by the operation of a conveying means (not shown). Head carriage 2 is allowed to reciprocate in the Y direction in FIG. 1, whereby recording head 3 held by head carriage 2 results in scanning.

Head carriage 2 is arranged above recording material P and houses a plurality of recording heads 3, described below, corresponding to the number of colors employed to print images. Ejection openings are arranged downward. Head carriage 2 is arranged in recording apparatus 1 in such a manner that reciprocal motion is allowed in the Y direction in FIG. 1, driven by the head scanning means.

In FIG. 1, head carriage 2 houses white (W), yellow (Y), magenta (M), cyan (C), black (K), light yellow (Ly), light magenta (Lm), light cyan (Lc), light black (Lk), and white (W) heads 3. However, in practice, the number of colors housed in carriage 2 is decided on a need basis.

Recording heads 3 eject an actinic radiation curable ink (e.g., a UV curable ink) supplied from an ink supply means (not shown) onto recording material P from the ejection opening by operation of a plurality of ejection means provided in the interior. The UV ink ejected from recording heads 3 is comprised of colorants, polymerizable monomers, initiators, and the like, and exhibits curing properties in such a manner that when exposed to ultraviolet radiation, monomers undergo crosslinking and polymerization reaction, while the aforesaid initiators function as a catalyst.

Recording head 3 is allowed to move for scanning from one edge of recording material P to the other edge thereof along the Y direction in FIG. 1, while driven by the head scanning means. During scanning, a UV ink is ejected in the form of ink droplets onto a definite region (ink droplet receivable region), whereby ink droplets are impinged onto the aforesaid ink droplet receivable region.

The aforesaid scanning is appropriately repeated and the UV ink is ejected within one of the ink droplet receivable regions. Subsequently, recording material P is appropriately conveyed from the front to the back of FIG. 1, employing a conveying means and scanning is again carried out employing the head scanning means. During the aforesaid scanning, the UV ink is ejected onto the subsequent ink droplet receivable region in the back direction of FIG. 1, adjacent to the aforesaid ink droplet receivable region.

The aforesaid operation is then repeated and an image comprised of an assemblage of UV ink droplets is formed on recording material P by ejected UV ink from recording heads 3, synchronized with the head scanning means and the conveying means.

Exposure means 4 is comprised of an ultraviolet radiation lamp which emits ultraviolet radiation of a specified wavelength region at consistent exposure energy, and a filter which transmits the ultraviolet radiation of the specified wavelengths. Herein, employed as ultraviolet radiation lamps may be mercury lamps, metal halide lamps, excimer lasers, ultraviolet lasers, cold cathode tubes, black-light lamps, and LEDs (light emitting diodes). Of these, preferred are band-shaped metal halide lamp tubes, cold cathode tubes, mercury lamps, or black-light lamps. Specifically, preferred are cold cathode tubes and black-light lamps which emit ultraviolet radiation at a wavelength of 365 nm, because bleeding is minimized, dot diameter is efficiently controlled, and wrinkling during curing is minimized. By employing the black light lamp as a radiation source of exposure means 4, it is possible to prepare exposure means 4 to cure the UV ink at a lower cost.

Exposure means 4 is shaped to be nearly equal to the maximum one which can be set by recording apparatus (being a UV ink-jet printer) 1 of the ink dot receivable region in which the UV ink is ejected during one frequency of scanning in which recording heads 3 are driven by the head scanning means, or is shaped to be larger than the ink dot receiving region.

Exposure means 4 are arranged and fixed on both sides of head carriage 2, being nearly parallel to recording material P.

As noted above, as a means to control illuminance in the ink ejection section, needless to say, the entire recording heads 3 must be shielded from light. In addition, it is effective that distance h2 between ink ejection section 31 of recording heads 3 and recording material P is adjusted to be greater than distance h1 between exposure means 4 and recording material P (i.e., h1<h2) and/or distance d between recording heads 3 and exposure means 4 increases (d increases). Further, it is more preferable that bellows structure 7 is arranged between recording heads 3 and exposure means 4.

Herein, it is possible to suitably change the wavelength of ultraviolet radiation which is exposed employing exposure means 4 by replacing ultraviolet radiation lamps or filters fitted to exposure means 4.

EXAMPLES

The present invention will now be described with reference to examples. However, the embodiments of the present invention are not limited to these examples.

Example 1

Exemplified Compounds 7, 11, 16, 17, and 20, which were sulfonium salts represented by General Formula (I)–(III), were prepared by dehydration condensation of diphenylsulfide substituted in sulfuric acid and diphenylsulfoxide, followed by salt exchange while using the prior art method.

Example 2

<<Preparation of Ink Composition>>

Ink Composition Set 1 (Comparative Example), comprised as described in Table 1 and Ink Composition Sets 2–5 (the present invention), comprised as described in Tables 2–5, were prepared.

In addition, Ink Composition Set 1b (Comparative Example) and Ink Composition Set 1c (Comparative Example) were prepared by replacing an photo-acid generating compound (Comparative Compound 1) used in Ink Composition Set 1 with Comparative Compound 2 and Comparative Compound 3, respectively.

TABLE 1

| | | | Ink Composition (weight percent) | | | | |
|---|---|---|---|---|---|---|---|
| | | | Photopolymerizable Compound | | Acid Increasing Agent | Thermal Base Generating Agent | Photolytically Acid Generating Agent |
| | Colorant | | Epoxy | Oxetane | | | |
| Ink Type | Type | Added Amount | Compound Celoxide | Compound OXT-221 | Aqupress 11M | Thermal Base 1 | Comparative Compound 1 |
| Ink Composition Set 1 (Comparative Example) | | | | | | | |
| K | Colorant 1 | 5.0 | 24.0 | 65.0 | 1.0 | 0.01 | 5.0 |
| C | Colorant 2 | 2.5 | 23.5 | 70.0 | 1.0 | 0.01 | 3.0 |
| M | Colorant 3 | 3.0 | 23.0 | 70.0 | 1.0 | 0.01 | 3.0 |
| Y | Colorant 4 | 2.5 | 23.5 | 70.0 | 1.0 | 0.01 | 3.0 |
| W | Colorant 5 | 5.0 | 24.0 | 65.0 | 1.0 | 0.01 | 5.0 |
| Lk | Colorant 1 | 0.6 | 25.4 | 70.0 | 1.0 | 0.01 | 3.0 |

TABLE 1-continued

| | Colorant | | Photopolymerizable Compound | | Acid Increasing Agent | Thermal Base Generating Agent | Photolytically Acid Generating Agent |
|---|---|---|---|---|---|---|---|
| Ink Type | Type | Added Amount | Epoxy Compound Celoxide | Oxetane Compound OXT-221 | Aqupress 11M | Thermal Base 1 | Comparative Compound 1 |
| Lc | Colorant 2 | 0.8 | 25.2 | 70.0 | 1.0 | 0.01 | 3.0 |
| Lm | Colorant 3 | 0.6 | 25.4 | 70.0 | 1.0 | 0.01 | 3.0 |
| Ly | Colorant 4 | 0.2 | 25.8 | 70.0 | 1.0 | 0.01 | 3.0 |

TABLE 2

| | Colorant | | Photopolymerizable Compound | | Acid Increasing Agent | Thermal Base Generating Agent | Photolytically Acid Generating Agent |
|---|---|---|---|---|---|---|---|
| Ink Type | Type | Added Amount | Epoxy Compound Celoxide | Oxetane Compound OXT-221 | Aqupress 11M | Thermal Base 1 | Exemplified Compound 7 |
| Ink Composition Set 2 (Present Invention) | | | | | | | |
| K | Colorant 1 | 5.0 | 24.0 | 65.0 | 1.0 | 0.01 | 5.0 |
| C | Colorant 2 | 2.5 | 23.5 | 70.0 | 1.0 | 0.01 | 3.0 |
| M | Colorant 3 | 3.0 | 23.0 | 70.0 | 1.0 | 0.01 | 3.0 |
| Y | Colorant 4 | 2.5 | 23.5 | 70.0 | 1.0 | 0.01 | 3.0 |
| W | Colorant 5 | 5.0 | 24.0 | 65.0 | 1.0 | 0.01 | 5.0 |
| Lk | Colorant 1 | 0.6 | 25.4 | 70.0 | 1.0 | 0.01 | 3.0 |
| Lc | Colorant 2 | 0.8 | 25.2 | 70.0 | 1.0 | 0.01 | 3.0 |
| Lm | Colorant 3 | 0.6 | 25.4 | 70.0 | 1.0 | 0.01 | 3.0 |
| Ly | Colorant 4 | 0.2 | 25.8 | 70.0 | 1.0 | 0.01 | 3.0 |

TABLE 3

| | Colorant | | Photopolymerizable Compound | | | Acid Increasing Agent | Basic Compound | Thermal Base Generating Agent | Photolytically Acid Generating Agent |
|---|---|---|---|---|---|---|---|---|---|
| Ink Type | Type | Added Amount | Epoxy Compound DAIMIC | Oxetane Compound Oxetane 1 | OXT-221 | Aqupress 11 | *5 | Thermal Base 2 | Exemplified Compound 11 |
| Ink Composition Set 3 (Present Invention) | | | | | | | | | |
| K | Colorant 1 | 5.0 | 8.0 | 35.0 | 43.9 | 3.0 | 0.01 | 0.1 | 5.0 |
| C | Colorant 2 | 2.5 | 8.0 | 30.0 | 53.4 | 3.0 | 0.01 | 0.1 | 3.0 |
| M | Colorant 3 | 3.0 | 8.0 | 30.0 | 52.9 | 3.0 | 0.01 | 0.1 | 3.0 |
| Y | Colorant 4 | 2.5 | 8.0 | 30.0 | 53.4 | 3.0 | 0.01 | 0.1 | 3.0 |
| W | Colorant 5 | 5.0 | 8.0 | 35.0 | 45.9 | 3.0 | 0.01 | 0.1 | 3.0 |
| Lk | Colorant 1 | 1.3 | 8.0 | 30.0 | 54.6 | 3.0 | 0.01 | 0.1 | 3.0 |
| Lc | Colorant 2 | 0.6 | 8.0 | 30.0 | 55.3 | 3.0 | 0.01 | 0.1 | 3.0 |
| Lm | Colorant 3 | 0.8 | 8.0 | 30.0 | 55.1 | 3.0 | 0.01 | 0.1 | 3.0 |
| Ly | Colorant 4 | 0.6 | 8.0 | 30.0 | 55.3 | 3.0 | 0.01 | 0.1 | 3.0 |

TABLE 4

Ink Composition (weight percent)

| | Colorant | | Photopolymerizable Compound | | | Basic Compound | Thermal Base Generating Agent | Photolytically Acid Generating Agent | Sensitizer |
|---|---|---|---|---|---|---|---|---|---|
| | | | Epoxy Compound | Oxetane Compound | | | | Exemplified Compound | |
| Ink Type | Type | Added Amount | Epolead | Oxetane 2 | OXT-221 | *6 | Thermal Base 1 | 17 | DBA |
| Ink Composition Set 4 (Present Invention) | | | | | | | | | |
| K | Colorant 1 | 5.0 | 5.0 | 20.0 | 63.8 | 0.1 | 0.1 | 5.0 | 1.0 |
| C | Colorant 2 | 2.5 | 5.0 | 15.0 | 73.3 | 0.1 | 0.1 | 3.0 | 1.0 |
| M | Colorant 3 | 3.0 | 5.0 | 15.0 | 72.8 | 0.1 | 0.1 | 3.0 | 1.0 |
| Y | Colorant 4 | 2.5 | 5.0 | 15.0 | 73.3 | 0.1 | 0.1 | 3.0 | 1.0 |
| W | Colorant 5 | 5.0 | 5.0 | 20.0 | 65.8 | 0.1 | 0.1 | 3.0 | 1.0 |
| Lk | Colorant 1 | 1.3 | 5.0 | 15.0 | 74.6 | 0.1 | 0.1 | 3.0 | 1.0 |
| Lc | Colorant 2 | 0.6 | 5.0 | 15.0 | 75.2 | 0.1 | 0.1 | 3.0 | 1.0 |
| Lm | Colorant 3 | 0.8 | 5.0 | 15.0 | 75.1 | 0.1 | 0.1 | 3.0 | 1.0 |
| Ly | Colorant 4 | 0.6 | 5.0 | 15.0 | 75.2 | 0.1 | 0.1 | 3.0 | 1.0 |

TABLE 5

Ink Composition (weight percent)

| | Colorant | | Photopolymerizable Compound | | | Acid Increasing Agent | Basic Compound | Thermal Base Generating Agent | Exemplified Compound of Photolytically Acid Generating Agent | | Sensitizer |
|---|---|---|---|---|---|---|---|---|---|---|---|
| | | | Epoxy Compound | Oxetane Compound | | | | | | | |
| Ink Type | Type | Added Amount | Adekasizer | Oxetane 1 | Oxetane 3 | OXT-221 | Compound 2 | *5 | Thermal Base 2 | 16 | 20 | CS7102 |
| *1 | | | | | | | | | | | | |
| K | *2 1 | 5.0 | 8.0 | 20.0 | 34.9 | 25.0 | 3.0 | 0.01 | 0.1 | 1.5 | 1.5 | 1.0 |
| C | *2 2 | 2.5 | 8.0 | 15.0 | 42.4 | 25.0 | 3.0 | 0.01 | 0.1 | 1.5 | 1.5 | 1.0 |
| M | *2 3 | 3.0 | 8.0 | 15.0 | 41.9 | 25.0 | 3.0 | 0.01 | 0.1 | 1.5 | 1.5 | 1.0 |
| Y | *2 4 | 2.5 | 8.0 | 15.0 | 42.4 | 25.0 | 3.0 | 0.01 | 0.1 | 1.5 | 1.5 | 1.0 |
| W | *2 5 | 5.0 | 8.0 | 20.0 | 34.9 | 25.0 | 3.0 | 0.01 | 0.1 | 1.5 | 1.5 | 1.0 |
| Lk | *2 1 | 1.3 | 8.0 | 15.0 | 43.6 | 25.0 | 3.0 | 0.01 | 0.1 | 1.5 | 1.5 | 1.0 |
| Lc | *2 2 | 0.6 | 8.0 | 15.0 | 44.3 | 25.0 | 3.0 | 0.01 | 0.1 | 1.5 | 1.5 | 1.0 |
| Lm | *2 3 | 0.8 | 8.0 | 15.0 | 44.1 | 25.0 | 3.0 | 0.01 | 0.1 | 1.5 | 1.5 | 1.0 |
| Ly | *2 4 | 0.6 | 8.0 | 15.0 | 44.3 | 25.0 | 3.0 | 0.01 | 0.1 | 1.5 | 1.5 | 1.0 |

*1; Ink Composition Set 5 (Present Invention)
*2; Colorant

Each ink and each compound described in Tables 1–5 are detailed below.

K: concentrated black ink
C: concentrated cyan ink
M: concentrated magenta ink
Y: concentrated yellow ink
W: white ink
Lk: low concentration black ink
Lc: low concentration cyan ink
Lm: low concentration magenta ink
Ly: low concentration yellow ink
Colorant 1: C.I. Pigment Black-7
Colorant 2: C.I. Pigment Blue-15:3
Colorant 3: C.I. Pigment Red-57:1
Colorant 4: C.I. Pigment Yellow-13
Colorant 5: titanium oxide (anatase type at an average particle diameter of 0.20 μm)
Comparative Compound 1: sulfonium salt compound having an S-C distance of 0.1682 nm
Comparative Compound 2: S-C distance of 0.1771 nm
Comparative Compound 3: S-C distance of 0.1762 nm
Exemplified Compound 7: $X^-=PF_6^-$ at an S-C distance of 0.1695 nm
Exemplified Compound 11: $X^-=PF_6^-$ at an S-C distance of 0.1696 nm Exemplified Compound 16: $X^-=PF_6^-$ at an S-C distance of 0.1696 nm Exemplified Compound 17: $X^-=PF_6^-$ at an S-C distance of 0.1693 nm Exemplified Compound 20: $X^-=PF_6^-$ at an S-C distance of 0.1695 nm Celoxide: Celoxide 2021P, manufactured by Daiseru Kagaku Kogyo Co.

OXT-211: manufactured by Toa Gosei Kagaku Co.

OXT-221: manufactured by Toa Gosei Kagaku Co.

DAIMIC: DAIMIC S300K, epoxidized soybean oil, manufactured by Daiseru Kagaku Kogyo Co.

Epolead: Epolead PB3600, epoxidized polybutadiene, manufactured by Daiseru Kakgaku Kogyo Co.

Adekasizer: Adekasizer-O-130P, epoxidized soybean oil (approved by FDA), manufactured by Asahi Denka Kogyo Co.

Aqupress 11: manufactured by Nippon Chemics Co.

Aqupress 11M: manufacture by Nippon Chemics Co.

CS7102: naphthalene derivative, manufactured by Nippon Soda Co., Ltd.

DBA: manufactured by Kawasawki Kasei Chemicals, Ltd.

*: N-ethyldiethanolamine

*: tributylamine

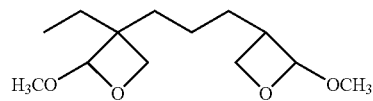

Oxetane 1

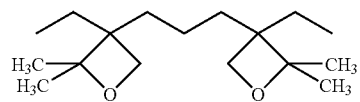

Oxetane 2

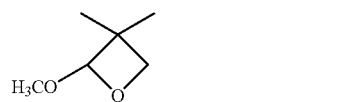

Oxetane 3

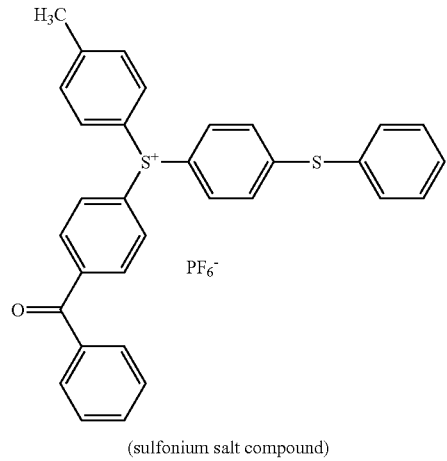

Comparative Compound 1 (sulfonium salt compound)

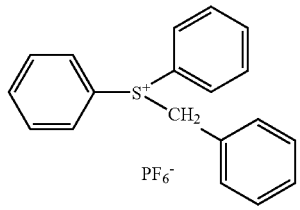

Comparative Compound 2

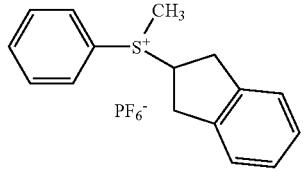

Comparative Compound 3

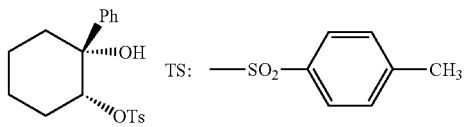

Compound 2

TS: —SO$_2$—〈—〉—CH$_3$

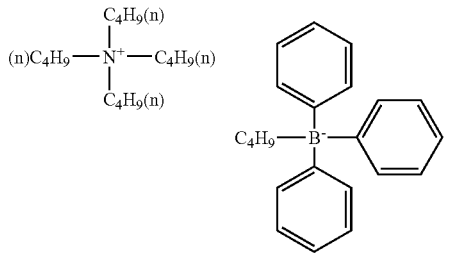

Thermal Base 1

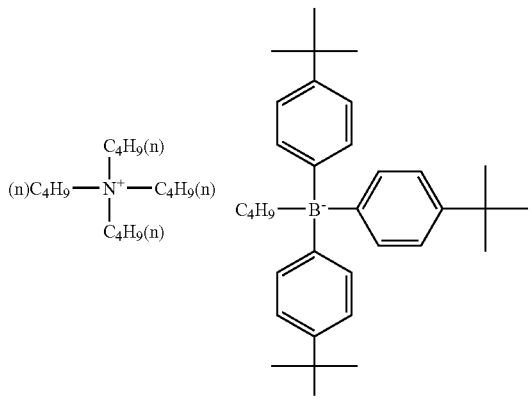

Thermal Base 2

<Ink-Jet Image Forming Method>>

Each of the Ink Composition Sets, prepared as above, was loaded in the ink-jet recording apparatus, shown in FIG. 1, which was fitted with piezo type ink-jet nozzles. Each image recording, described below, was continuously carried out on each of 600 mm wide and 1,000 m long recording materials having each of the surface energies described in Table 6. The ink supply system was comprised of an ink tank, a supply pipe, a pre-chamber ink tank immediately prior to the head, piping fitted with filters, and a piezo head. The aforesaid ink supply system was heated to 50° C., while the system from the pre-chamber tank to the head portion was insulated from heat. The aforesaid piezo head was driven to eject multi-sized dots of 2–15 µl at a resolution of 720 dpi×720 dpi (dpi refers to the number of dots per inch or per 2.54 cm) and each ink was continuously ejected. After ink impingement, each sample was subjected to a curing treatment under exposure conditions described in Table 6. Incidentally, Samples 1–8 were exposed 0.2–2 after ink impingement, while Samples 9–20 were exposed 0.1 second after ink impingement.

Samples N1 to N8 were prepared by using Ink Composition Sets 1b and 1c, and then were exposed 0.2–2 after ink impingement.

After recording, the total ink layer thickness was determined, resulting in the range of 2.3–13 μm. The term "dpi", as employed in the present invention, refers to the number of dots per 2.54 cm.

Further, according to the aforesaid method, ink-jet images were formed under each of the ambiences of 10° C. and 20 percent relative humidity, 25° C. and 50 percent relative humidity, and 32° C. at 80 percent relative humidity.

Abbreviations used in Table 6 for each of the recoding materials stand for the following.

OPP: oriented polypropylene
PET: polyethylene terephthalate
Shrink OPS: commercially available oriented polystyrene for shrink use Further, exposure light sources described in Tale 6 are detailed below.

Exposure Light Source 1: 120 W/cm metal halide lamp (MAL 400NL, 3 kW power source, manufactured by Nippon Denchi Co.)

Exposure Light Source 2: cold cathode tube (having a light source power consumption of less than 1 kW·hr, manufactured by HYBEC Corp.)

Exposure Light Source 3: LED (special order product having a light source power consumption of less than 1 kW·hr, manufactured by NICHIA Corp.)

Further, exposure methods described in Table 6 are detailed below.

Exposure Method A: exposure employing a linear light source from both ends of the recording head Exposure Method B: exposure employing 8 linear light sources from both ends of the recording head Exposure Method C: exposure employing 20 LED light sources In Table 6 and Table 6B are shown the recording material and the exposure condition for each Sample.

Samples N1 to N8 were prepared in the same manner as Samples 1 to 8 respectively.

TABLE 6

| Sample No. | Ink Set No. | Recording Material Type | Recording Material Surface Energy mN/m | Type of Exposure Light Source | Exposure Method | Surface of Recording Material A Peak Wavelength nm | Surface of Recording Material A Maximum Illuminance mW/cm² | Exposure Light Source Condition Peak Wavelength nm | Exposure Light Source Condition Energy mJ/cm² | Remarks |
|---|---|---|---|---|---|---|---|---|---|---|
| 1 | 1 | OPP | 38 | 1 | A | 365 | 650 | 365 | 180 | Comp. |
| 2 | 1 | PET | 53 | 1 | A | 365 | 650 | 365 | 180 | Comp. |
| 3 | 1 | Shrink OPS | 39 | 1 | A | 365 | 650 | 365 | 180 | Comp. |
| 4 | 1 | *1 | *2 | 1 | A | 365 | 650 | 365 | 180 | Comp. |
| 5 | 2 | OPP | 38 | 1 | A | 365 | 650 | 365 | 180 | Inv. |
| 6 | 2 | PET | 53 | 1 | A | 365 | 650 | 365 | 180 | Inv. |
| 7 | 2 | Shrink OPS | 39 | 1 | A | 365 | 650 | 365 | 180 | Inv. |
| 8 | 2 | *1 | *2 | 1 | A | 365 | 650 | 365 | 180 | Inv. |
| 9 | 3 | OPP | 38 | 2 | B | 310 | 10 | 310 | 33 | Inv. |
| 10 | 3 | PET | 53 | 2 | B | 310 | 10 | 310 | 33 | Inv. |
| 11 | 3 | Shrink OPS | 39 | 2 | B | 310 | 10 | 310 | 33 | Inv. |
| 12 | 3 | *1 | *2 | 2 | B | 310 | 10 | 310 | 33 | Inv. |
| 13 | 4 | OPP | 38 | 3 | C | 380 | 40 | 380 | 80 | Inv. |
| 14 | 4 | PET | 53 | 3 | C | 380 | 40 | 380 | 80 | Inv. |
| 15 | 4 | Shrink OPS | 39 | 3 | C | 380 | 40 | 380 | 80 | Inv. |
| 16 | 4 | *1 | *2 | 3 | C | 380 | 40 | 380 | 80 | Inv. |
| 17 | 5 | OPP | 38 | 3 | C | 380 | 40 | 380 | 80 | Inv. |
| 18 | 5 | PET | 53 | 3 | C | 380 | 40 | 380 | 80 | Inv. |
| 19 | 5 | Shrink OPS | 39 | 3 | C | 380 | 40 | 380 | 80 | Inv. |
| 20 | 5 | *1 | *2 | 3 | C | 380 | 40 | 380 | 80 | Inv. |

Comp.; Comparative Example
Inv.; Present Invention
*1; Shasu Coated Paper
*2; water absorptive material

TABLE 6B

| Sample No. | Ink Set No. | Recording Material Type | Recording Material Surface Energy mN/m | Type of Exposure Light Source | Exposure Method | Surface of Recording Material A Peak Wavelength nm | Surface of Recording Material A Maximum Illuminance mW/cm² | Exposure Light Source Condition Peak Wavelength nm | Exposure Light Source Condition Energy mJ/cm² | Remarks |
|---|---|---|---|---|---|---|---|---|---|---|
| N1 | 1b | OPP | 38 | 1 | A | 365 | 650 | 365 | 180 | Comp. |
| N2 | 1b | PET | 53 | 1 | A | 365 | 650 | 365 | 180 | Comp. |
| N3 | 1b | Shrink OPS | 39 | 1 | A | 365 | 650 | 365 | 180 | Comp. |
| N4 | 1b | *1 | *2 | 1 | A | 365 | 650 | 365 | 180 | Comp. |
| N5 | 1c | OPP | 38 | 1 | A | 365 | 650 | 365 | 180 | Comp. |
| N6 | 1c | PET | 53 | 1 | A | 365 | 650 | 365 | 180 | Comp. |
| N7 | 1c | Shrink OPS | 39 | 1 | A | 365 | 650 | 365 | 180 | Comp. |
| N8 | 1c | *1 | *2 | 1 | A | 365 | 650 | 365 | 180 | Comp. |

Comp.; Comparative Example
Inv.; Present Invention
*1; Shasu Coated Paper
*2; water absorptive material <<Evaluation of Ink-Jet Recording Images>>

Each image which was recorded employing the aforesaid image recoding method was subjected to each evaluation described below. Each evaluation was carried out in a printing ambience under the three conditions described above.

<<Character Quality>>

At the target density of each of colors Y, M, C, and K, 6-point MS Ming-style characters were printed and jaggedness of characters was evaluated employing a common magnifying glass. Character quality was then evaluated based on the criteria described below.

A: No jaggedness was noticed
B: Slight jaggedness was noticed
C: Jaggedness was noticed but characters were identifiable, resulting in the lower limit for commercial viability
D: Jaggedness was pronounced, resulting in no commercial viability due to blurring of characters <<Color Mixing (Bleeding)>>

Printing was carried out so that dots of each of the Y, M, C, and K colors, were adjacent to each other, and dots of each color, adjacent to each other were visually observed employing a common magnifying glass and color mixing was evaluated based on the criteria described below.

A: The shapes of dots adjacent to each other were circular, resulting in no bleeding
B: The shapes of dots adjacent to each other were nearly circular, exhibiting almost no bleeding
C: Dots adjacent to each other exhibited slight bleeding and the dot shapes were slightly deformed, resulting in the lower limit for commercial viability
D: Dots adjacent to each other exhibited bleeding and mixing, resulting in a commercially unviable product Table 7 shows the results.

TABLE 7

| Sample No. | Ambience at 10° C. and 20% RH Character Quality | Ambience at 10° C. and 20% RH Color Mixing | Ambience at 25° C. and 50% RH Character Quality | Ambience at 25° C. and 50% RH Color Mixing | Ambience at 32° C. and 80% RH Character Quality | Ambience at 32° C. and 80% RH Color Mixing | Remarks |
|---|---|---|---|---|---|---|---|
| 1 | B | B | C | B | D | C | Comp. |
| 2 | B | B | B | C | C | D | Comp. |
| 3 | B | B | B | B | D | D | Comp. |
| 4 | B | B | B | C | D | D | Comp. |
| 5 | B | B | B | B | C | B | Inv. |
| 6 | B | B | B | B | B | C | Inv. |
| 7 | B | B | B | B | B | B | Inv. |
| 8 | A | A | B | B | B | B | Inv. |
| 9 | B | A | B | A | B | A | Inv. |
| 10 | A | A | A | A | A | B | Inv. |
| 11 | A | A | A | A | A | B | Inv. |
| 12 | A | B | A | B | A | B | Inv. |
| 13 | B | A | B | A | B | A | Inv. |
| 14 | A | B | A | B | A | B | Inv. |
| 15 | B | A | B | A | B | A | Inv. |
| 16 | A | B | A | B | B | B | Inv. |
| 17 | B | A | B | A | B | A | Inv. |
| 18 | A | A | A | B | A | B | Inv. |

TABLE 7-continued

| Sample No. | Ambience at 10° C. and 20% RH | | Ambience at 25° C. and 50% RH | | Ambience at 32° C. and 80% RH | | Remarks |
|---|---|---|---|---|---|---|---|
| | Character Quality | Color Mixing | Character Quality | Color Mixing | Character Quality | Color Mixing | |
| 19 | A | A | A | A | A | B | Inv. |
| 20 | A | A | A | A | A | A | Inv. |
| N1 | B | B | D | C | D | D | Comp. |
| N2 | B | B | C | D | D | D | Comp. |
| N3 | B | B | D | C | D | D | Comp. |
| N4 | B | B | C | C | D | D | Comp. |
| N5 | B | B | D | C | D | D | Comp. |
| N6 | B | B | C | D | D | D | Comp. |
| N7 | B | B | D | C | D | D | Comp. |
| N8 | B | B | D | D | D | D | Comp. |

Comp.; Comparative Example
Inv.; Present Invention

As can clearly be seen from Table 7, the image forming method employing ink sets comprised of actinic radiation curable composition of the present invention exhibited excellent character quality, resulted in no color mixing and was capable of recording highly detailed images, empolying various recording materials.

According to the present invention, it is possible to provide an actinic radiation curable composition and an actinic radiation curable ink which are capable of very consistently recording highly detailed images which exhibit excellent text quality and result in no generation of color mixing, and an image forming method as well as an ink-jet recording apparatus using the same.

What is claimed is:

1. An actinic radiation curable composition, comprising a photopolymerizable monomer and a photo-acid generating agent selected from the group consisting of compounds represented by Formulas (I)–(III):

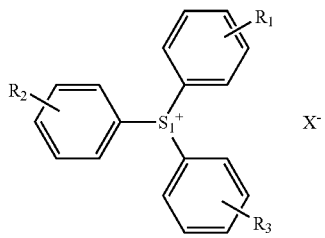

Formula (I)

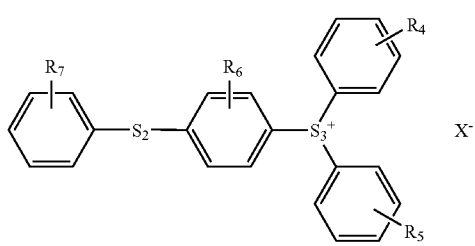

Formula (II)

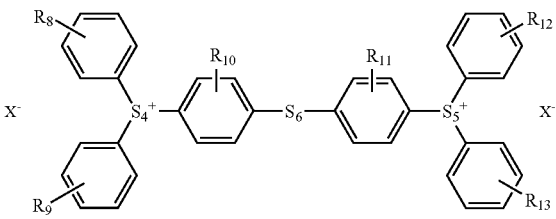

Formula (III)

wherein $R_1$–$R_{13}$ each represents a hydrogen atom or a substituent selected from the group consisting of an alkyl group, a halogenated alkyl group, an alkoxy group, a carbonyl group, a phenylthio group, a halogen atom, a cyano group, a nitro group and a hydroxy group, provided that $R_1$–$R_3$, $R_4$–$R_7$ and $R_8$–$R_{13}$ do not represent a hydrogen atom at the same time, $S_1$–$S_6$ each represents a sulfur atom, each of $S_1$–$S_5$ having three bonds each bond being to a different adjacent carbon atom, at least one of the bonds between $S_1$ and the adjacent C atom in Formula (I) having a bond distance in the range of 0.1688 nm–0.1750 nm and none having a bond distance greater than 0.1750 nm, at least one of the bonds between $S_3$ and the adjacent C atom in Formula (II) having a bond distance in the range of 0.1688 nm–0.1750 nm and none having a bond distance greater than 0.1750 nm, at least one of the bonds between $S_4$ and the adjacent C atom and at least one of the bonds between $S_5$ and the adjacent C atom in Formula (III), having a bond distance in the range of 0.1688 nm–0.1750 nm and none having a bond distance greater than 0.1750 nm, and X represents a non-nucleophilic anion group.

2. The actinic radiation curable composition of claim 1, comprising the photopolymerizable monomer having an oxetane ring in the molecule.

3. The actinic radiation curable composition of claim 1, comprising the photopolymerizable monomer having an oxirane group in the molecule.

4. The actinic radiation curable composition of claim 1, comprising the following phobopolymerizable monomers (a) a compound having at least one oxetane ring in the molecule in an amount of 60–95 weight percent;

(b) a compound having at least one oxirane group in an amount of 5–40 weight percent; and (c) a vinyl ether compound in an amount of 0–40 weight percent, each weight percent being based on the total weight of the composition.

5. The actinic radiation curable composition of claim 1, comprising the following photopolymerizable monomers:

(a) a compound having one oxetane ring in the molecule; and (b) a compound having at least two oxetane rings in the molecule.

6. The actinic radiation curable composition of claim 1, having a viscosity of 7–50 mPa·s at 25° C.

7. The actinic radiation curable composition of claim 1 which is an ink-jet ink and further comprises a pigment.

8. The actinic radiation curable composition of claim 1, wherein the substituent of $R_1$–$R_{13}$ is selected from the group consisting of a methyl group, an ethyl group, a propyl group, an isopropyl group, a butyl group, an isobutyl group, a t-butyl group, a pentyl group, a hexyl group; a trifluoromethyl group, a difluoromethyl group; a methoxy group, an ethoxy group, a propoxy group, a butoxy group, a hexyloxy group, a decyloxy group, a dodecyloxy group; an acetoxy group, a propionyloxy group, a decylcarbonyloxy group, a dodecylcarbonyloxy group, a methoxycarboflyl group, an ethoxycarboflyl group, a benzoylOxy group; a phenylthio group; fluorine, chlorine, bromine, iodine; a cyano group; a nitro group; and a hydroxy group.

9. An image forming method using the actinic radiation curable ink of claim 7, comprising the steps of:

(a) jetting a droplet of the ink from a nozzle of an ink-jet recording head to form an image onto a recording material; and (b) irradiating the image with an actinic ray, wherein the irradiation step is carried out between 0.001 and 2.0 seconds after jetting the droplet of the ink.

10. An image forming method using the actinic radiation curable ink of claim 7, comprising the steps of:

(a) jetting a droplet of the ink.from a nozzle of an ink-jet recording head to form an image onto a recording material; and (b) irradiating the image with an actinic ray, wherein after the irradiation step, a thickness of the ink on the recording material is 2–20 μm.

11. An image forming method using the actinic radiation curable ink of claim 7, comprising the steps of:

(a) jetting a droplet of the ink from a nozzle of an ink-jet recording head to form an image onto a recording material; and (b) irradiating the image with an actinic ray, wherein a volume of the droplet of the ink jetted from the nozzle is 2–15 p1.

* * * * *